April 6, 1926.  W. B. HODGE  1,579,706
CALCULATING DEVICE
Filed Dec. 23, 1922
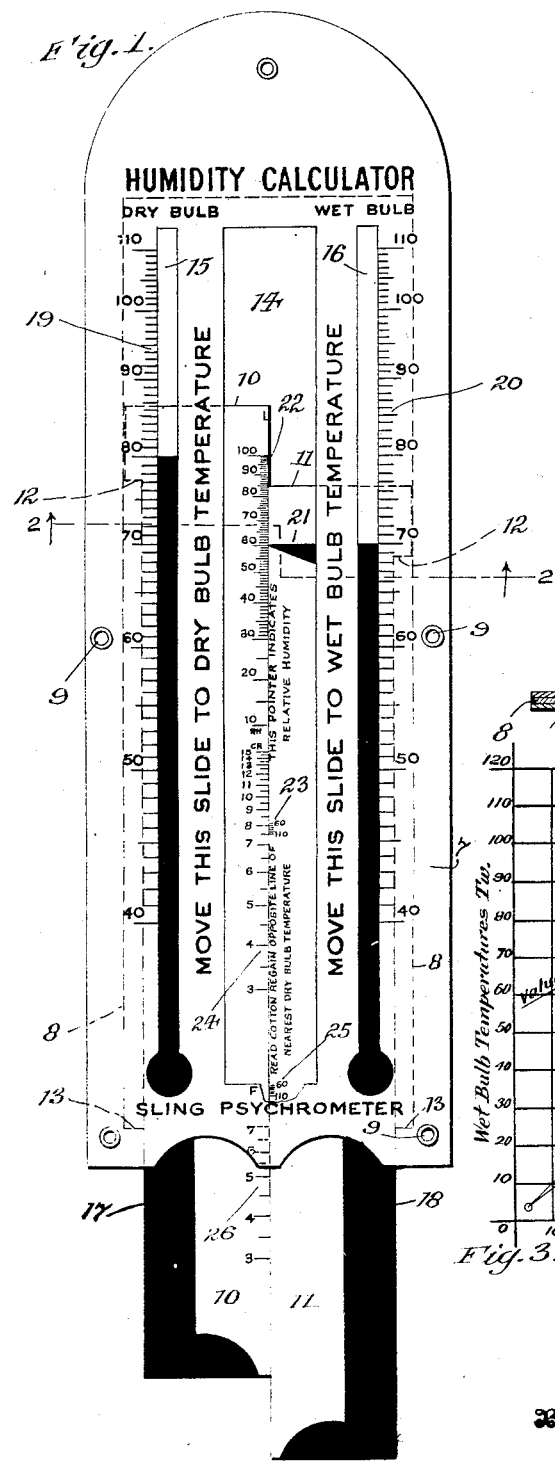
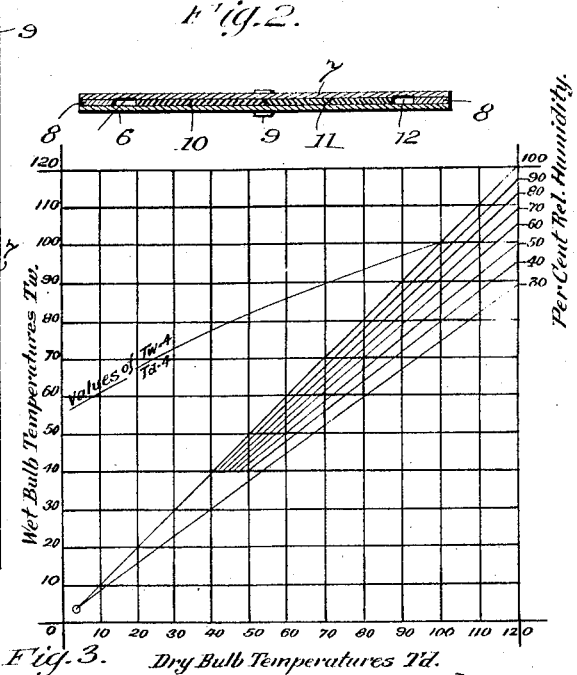

Patented Apr. 6, 1926.

UNITED STATES PATENT OFFICE.

WILLIAM B. HODGE, OF CHARLOTTE, NORTH CAROLINA, ASSIGNOR TO PARKS-CRAMER COMPANY, OF FITCHBURG, MASSACHUSETTS, A CORPORATION OF MASSACHUSETTS.

CALCULATING DEVICE.

Application filed December 23, 1922. Serial No. 608,634.

*To all whom it may concern:*

Be it known that I, WILLIAM B. HODGE, a citizen of the United States, residing at Charlotte, in the county of Mecklenburg and State of North Carolina, have invented certain new and useful Improvements in Calculating Devices, of which the following is a specification.

This invention relates to calculating devices and more specifically to a special form of slide rule for use in determining relative humidity, and cotton regain (either or both), from the wet bulb and dry bulb readings of psychrometers and hygrometers.

The extensive use of such instruments in textile mills and other manufacturing plants, as an incident to the operation of systems of artificial humidification, has created a demand for a calculating device for readily interpreting their readings. Such a calculating device, to be entirely satisfactory, must be capable of successful use by ordinary mill operatives. An important feature of the present invention is the construction of the temperature scales and temperature indices to simulate the scales and indicating fluid columns of the wet bulb and dry bulb thermometers, and the arrangement of the other scales and indices so that they are set by the setting of the temperature indices. Hence, the only manipulation is to set the slides to reproduce the readings of the thermometers. The relative humidity and cotton regain can then be read directly.

The preferred embodiment of the invention and its operative principle are illustrated in the accompanying drawing, in which:—

Fig. 1 is a front elevation of the complete slide rule.

Fig. 2 is a section on the line 2—2 of Fig. 1.

Fig. 3 is a plot of relative humidity in terms of Fahrenheit temperatures.

The fundamental principle of the device is briefly as follows:—

If the values of relative humidity within the temperature range ordinarily encountered in cotton mill work be plotted in terms of wet bulb temperatures ($Tw$), as ordinates, and dry bulb temperatures ($Td$), as abscissæ, the plot will consist of a divergent series of lines, each representing a different constant relative humidity. Within the limits stated, these lines are practically straight, and they can, with reasonable accuracy, be represented as straight lines, which, if projected beyond the limits stated, will pass through the common point $Tw=4°$, $Td=4°$ (Fahrenheit). This plot is familiar to those skilled in the art, but in the interests of a full disclosure is included in the drawing as Figure 3.

It follows from the nature of the plot, that within the limits stated, relative humidity can be expressed with reasonable accuracy as a function of the angle whose tangent is $$\frac{Tw-4°}{Td-4°},$$

and the logarithm of relative humidity is proportional to $\log(Tw-4°)-\log(Td-4°)$.

Consequently, the interval between two different graduations on a rule graduated in terms of $\log(T-4°)$ is always proportional to the logarithm of the relative humidity indicated by corresponding dry and wet bulb temperatures. A properly proportioned logarithmic scale will give relative humidity directly, when read against such interval. As a matter of fact the error due to the use of the approximate, straight-line plot, above defined, is probably within the manipulative error incident to the use of a slide rule of any convenient size.

In order to simplify manipulation, I make use of two identical logarithmic temperature scales, one for wet bulb and the other for dry bulb temperatures, and provide a sliding index for each. One of these indices carries the logarithmic scale of relative humidity, and the other carries an index coacting with said relative humidity scale.

This arrangement has a further advantage, for, since cotton regain, i. e., the moisture content of the cotton fiber at a given temperature and humidity, is a function of the relative humidity and of the dry bulb temperature, it becomes possible to add to the sliding indices a logarithmic scale of cotton regain, and a coacting series of indices corresponding to dry bulb temperatures.

While I describe the invention in terms of Fahrenheit temperatures, obviously the general principle holds for other systems of thermometric graduation.

The invention may be embodied in various specifically different mechanical structures, but the one illustrated has advantages of simplicity and economy in manufacture which recommend it.

As is best shown in Fig. 2, the body of the rule comprises a back plate 6 of any suitable rigid sheet material, for example opaque celluloid; a cover plate 7, also of celluloid having opaque and transparent portions as hereafter described; and a spacing member 8, interposed between the sheets 6 and 7. The parts 6, 7 and 8 are connected by eyelets or rivets 9. The spacing member 8 has the general form of an inverted letter U, and thus provides between the back plate 6 and cover plate 7 a longitudinal guideway for two independent longitudinally movable slides 10 and 11 preferably of opaque celluloid. Complete withdrawal of the slides is prevented by shoulders 12 formed on the slides 10 and 11 respectively, which are arrested by opposing shoulders 13, 13 formed on the spacing member 8.

The cover member 7 is opaque, except for three transparent areas. The first is the longitudinally extending rectangular area 14 through which the scales and indices of relative humidity and cotton regain are read. The other transparent areas are two parallel narrow strips representing thermometer tubes, and indicated generally by the reference numerals 15 and 16. In Fig. 1, these are shown partly white and partly black, the black parts representing portions of black index strips 17 and 18 printed on the slides 10 and 11 and visible through the transparent strips.

In other words, the black areas 17 and 18 on the slides 10 and 11 are movable temperature indices which are visible through the transparent areas 15 and 16, and which simulate the appearance of the columns of indicating liquid in two parallel thermometer tubes. The area 15 represents the dry bulb thermometer, the area 16 the wet bulb thermometer. Each is provided with a corresponding series of graduations 19 and 20 which represent Fahrenheit thermometer scales, but which are graduated proportionally to log (T−4°). The two scales are identical and, as illustrated in the drawing, extend from 40° to 110° F.

The upper end of the blackened area 18 on the slide 11 is marked by an index 21 extends to the left of the slide 10 and there is read against the logarithmically graduated relative humidity scale 22 on the right-hand edge of the slide 10. This relative humidity scale extends from the graduation marked 100 near the top of the slide 10 down to the letters RH.

For indicating cotton regain, a series of indices 23 is provided on the slide 11. These indices are used selectively to correspond to the nearest dry bulb reading. As shown in Fig. 1, the uppermost index corresponds to a dry bulb temperature of 60, and the lowermost index to a dry bulb reading of 110, the intervening indices corresponding to dry bulb temperatures at 10° intervals between these two limits. The appropriate one of these indices is read against the logarithmically graduated cotton regain scale 24 which, in Fig. 1, extends from the letters CR to the graduation 3. As the cotton regain indices and scale are likely to be obscured in certain settings of the rule, the indices are duplicated at 25 and the lower portion of the scale is duplicated at 26.

Calculators for interpreting the readings of psychrometers and those for interpreting the readings of stationary hygrometers differ characteristically from each other in their graduations, but no difference of principle is involved.

Instructions for use of the device are printed on the face of the rule, and appear in Fig. 1. The device there shown is graduated to interpret the results of a sling psychrometer. Assuming that such instrument gives a dry bulb reading of 80° and a wet bulb reading of 70°, the slide 10 is adjusted so that the upper end of the black area 17 is at 80, and the slide 11 is adjusted so that the upper end of the black area 18 is at 70. Under these conditions, the appearance of the device simulates the appearance of the two thermometer scales on the psychrometer. The index 21 will then indicate relative humidity on the scale 22. As indicated in Fig. 1, which shows such a setting, the relative humidity is 61%.

To determine cotton regain, the appropriate index 23, i. e., the one corresponding to a dry bulb indication of 80°, is chosen. This is the third index from the top, which, when read against the scale 24, gives a cotton regain of slightly less than 8%.

It will be observed that the rule is set by a very simple operation, and that, when the two temperature scales are set, both the other values may be read directly.

What is claimed is:—

1. A calculating device for determining relative humidity from the readings of wet and dry bulb thermometers, comprising in combination two longitudinally and relatively movable slides, one carrying a logarithmically divided scale of relative humidity and the other a coacting index; and means for setting said slides, one according to the wet and the other according to the dry bulb thermometer readings, comprising logarithmically divided temperature scales and coacting indices.

2. A calculating device for determining cotton regain from the readings of wet and dry bulb thermometers, comprising in combination two longitudinally and relatively movable slides, one carrying a logarithmically divided scale of cotton regain and the other a series of coacting indices corresponding to different temperatures; and means for setting said scales, one according to the wet and the other according to the dry bulb thermometer readings, comprising logarithmically divided temperature scales and coacting indices.

3. A calculating device for determining relative humidity from the readings of wet and dry bulb thermometers, comprising in combination two relatively fixed logarithmically graduated temperature scales, one for wet and the other for dry bulb temperatures; and two parallel slides each provided with an index coacting with a corresponding one of said temperature scales, one of said slides carrying a scale graduated logarithmically in terms of relative humidity and the other an index coacting therewith.

4. A calculating device for determining relative humidity from the readings of wet and dry bulb thermometers, comprising in combination two relatively fixed logarithmically divided temperature scales, one for wet bulb and the other for dry bulb temperatures; and two parallel slides each provided with an index coacting with a corresponding one of said scales, and each such index being constructed and arranged to simulate the indicating fluid column of a thermometer, one of said slides having a scale graduated logarithmically in terms of relative humidity and the other an index coacting therewith.

5. A calculating device for determining cotton regain from the readings of wet and dry bulb thermometers, comprising in combination two relatively fixed logarithmically divided temperature scales, one for wet bulb and the other for dry bulb temperatures; and two parallel slides each provided with an index coacting with a corresponding one of said scales, and each such index being constructed and arranged to simulate the indicating fluid column of a thermometer, one of said slides having a scale graduated logarithmically in terms of cotton regain and the other a series of indices corresponding to different temperature settings of such slide relatively to the corresponding logarithmically divided temperature scale, coacting with said regain graduations.

6. A calculating device for determining relative humidity from the readings of wet and dry bulb thermometers, comprising in combination an opaque plate having two parallel transparent areas simulating the tubes of two thermometers, and provided with logarithmically divided temperature scales, one adjacent each of said areas, one scale for wet bulb and the other for dry bulb temperatures; and two longitudinally and independently movable parallel slides, each having a portion extending behind said plate, visible through a corresponding one of said transparent areas, and simulating the indicating fluid of a thermometer, whereby they serve as indices coacting with respective temperature scales, one of said slides being provided with a scale graduated logarithmically in terms of relative humidity and the other being provided with an index coacting with the last named scale.

7. A calculating device for determining relative humidity from the readings of wet and dry bulb thermometers, comprising in combination two longitudinally and relatively movable slides, one carrying a logarithmically divided scale of relative humidity and the other a coacting index; and means for setting said slides, one according to the wet and the other according to the dry bulb thermometer readings, comprising indices and coacting temperature scales, the division lines of said scales being spaced proportionally to the logarithms of temperatures four Fahrenheit degrees less than the numerical graduations applied to such division lines.

In testimony whereof I have signed my name to this specification.

WILLIAM B. HODGE.